United States Patent
Boac et al.

(10) Patent No.: US 10,367,700 B2
(45) Date of Patent: Jul. 30, 2019

(54) NODE IDENTIFICATION USING TEMPLATES

(71) Applicant: HEWLETT PACKARD ENTERPRISE DEVELOPMENT LP, Houston, TX (US)

(72) Inventors: Corneliu Boac, Eagan, MN (US); Erik Jacobson, Eagan, MN (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 53 days.

(21) Appl. No.: 15/614,289

(22) Filed: Jun. 5, 2017

(65) Prior Publication Data

US 2018/0351833 A1 Dec. 6, 2018

(51) Int. Cl.
*H04L 12/24* (2006.01)
*H04L 12/759* (2013.01)
*G06F 16/38* (2019.01)

(52) U.S. Cl.
CPC ........ *H04L 41/5048* (2013.01); *G06F 16/381* (2019.01); *H04L 45/028* (2013.01)

(58) Field of Classification Search
CPC ............... H04L 41/5048; H04L 45/028; G06F 17/30725; G06F 16/381
See application file for complete search history.

(56) References Cited

U.S. PATENT DOCUMENTS

| | | | |
|---|---|---|---|
| 7,643,434 B2 | 1/2010 | Mandavilli et al. | |
| 7,644,130 B2 | 1/2010 | Magro et al. | |
| 9,331,910 B2 | 5/2016 | Dutt et al. | |
| 2005/0240776 A1* | 10/2005 | Schmidt | G06F 9/44505 713/185 |
| 2011/0022694 A1* | 1/2011 | Dalal | H04L 41/0843 709/222 |
| 2015/0113001 A1 | 4/2015 | Prieto et al. | |
| 2018/0032372 A1* | 2/2018 | Devendran | G06F 9/5011 |
| 2018/0183714 A1* | 6/2018 | Hay | H04L 47/22 |

OTHER PUBLICATIONS freedesktop.org, "Predictable Network Interface Names," (Web Page), Nov. 17, 2016, 3 pages, https://www.freedesktop.org/wiki/Software/systemd/PredictableNetworkInterfaceNames/.

* cited by examiner

*Primary Examiner* — Michael Thier
*Assistant Examiner* — Brian P Cox
(74) *Attorney, Agent, or Firm* — Hewlett Packard Enterprise Patent Department (57) ABSTRACT

In one example in accordance with the present disclosure, a system may comprise a node accessor to access a first node belonging to a plurality of nodes and an interface determiner to determine a hardware interface associated with the first node. The system may comprise a template determiner to determine a template corresponding to the hardware interface, wherein the template contains a predefined identifier associated with the hardware interface. The system may comprise a network handler to identify a network associated with the predefined identifier associated with the hardware interface; and a network associater to associate each node in the plurality of nodes, including the first node, with a network specified in the template.

20 Claims, 5 Drawing Sheets

NODE IDENTIFICATION USING TEMPLATES

BACKGROUND

A cluster environment is a group of multiple system images spanning across a plurality of nodes. Cluster environments may have hundreds or thousands of nodes. When a cluster environment is provisioned and/or additional nodes are added to an existing cluster, these nodes may be named.

BRIEF DESCRIPTION OF THE DRAWINGS

The following detailed description references the drawings, wherein.

DETAILED DESCRIPTION

One technique for naming in a cluster environment is "predictable naming." Predictable network names assigns a name for similar hardware the system. For example, a set of predictable names for a set of devices having a similar PCI bus hardware configuration may include ens20f0, ens20f1, ens20f2, ens20f3, etc. Of course, this is a simplified example and predictable naming may be used in cases of hundreds, thousands, etc. of devices having similar hardware configurations.

Predictable names may be assigned, for example, based on a network interface card (NIC). Predictable names are different for different types of nodes with different types of hardware (for example motherboards), but predictable names are the same across like hardware. For example, if your cluster has one type of compute node, then the predictable names may be the same for all compute nodes in the cluster.

In addition to naming, there are other problems associated with provisioning nodes for a cluster. Each node, or more specifically each interface for each node, may be tied to a particular network used in the cluster environment. However, a given cluster environment may have many different networks in use to be tied to interfaces. For example, management networks for normal compute nodes, hierarchical management networks for larger systems that string together sub-clusters together to form a giant one and data networks (40 GigE, 10 GigE, etc.).

Systems and methods for node identification using templates use a node template to group like-settings together and apply them to a set of like nodes during discover. The use of node templates may also provide a means to tie predictable network names to networks. In other words, the node templates allow a node to get settings at discovery time—including those settings needed to let it install properly. The node templates may also allow for a determination of which interfaces are combined together or bonded together and which interfaces (or bonds mentioned above) are tied to which networks.

For example, in a cluster environment may include a first network for system management and a second network for a public network connection. An administrator may want to combine the networks into a trunking pair and use the combined network as a data network for jobs. Systems and methods implementing templates for node identification may direct those two interfaces to said network and configures the network configuration files to implement this. Moreover, the template may describe what sort of bonding/trunking/link aggregation is used.

Because the names are known ahead of time, and thus are "predictable", templates may be created tying the hardware interfaces, via the predictable names, to different groupings of nodes. One example grouping is a network that the nodes may belong to. In the network example, the template may provide network configuration settings including Internet Protocol (IP) address. Another example grouping is for disk drives. In the disk drive example, the template may provide information on filesystems, partition tables, volume management, grouping of the disk drives (RAID, etc.), etc. These are example groupings and the techniques and templates discussed herein may be used with other types of grouping where the hardware interfaces are named using predictable naming techniques.

Accordingly, when new nodes are added and the hardware interface is identified, a template corresponding to the hardware interface may be determined. Using the information in that template, the node may be associated with a different grouping, such as a network. Once a grouping is associated with the node, various configuration settings associated with that grouping may be applied to the node. For example, if the grouping is a network, the node may be configured to operate on the network, the node may be assigned an Internet Protocol (IP) address, etc.

A system for node identification using templates may comprise a node accessor to access a first node belonging to a plurality of nodes and an interface determiner to determine a hardware interface associated with the first node. The system may comprise a template determiner to determine a template corresponding to the hardware interface, wherein the template contains a predefined identifier associated with the hardware interface, and a network handler to identify a network associated with predefined identifier associated with the hardware interface. The system may comprise a network associater to associate each node in the plurality of nodes, including the first node, with a network specified in the template.

Figure 1:
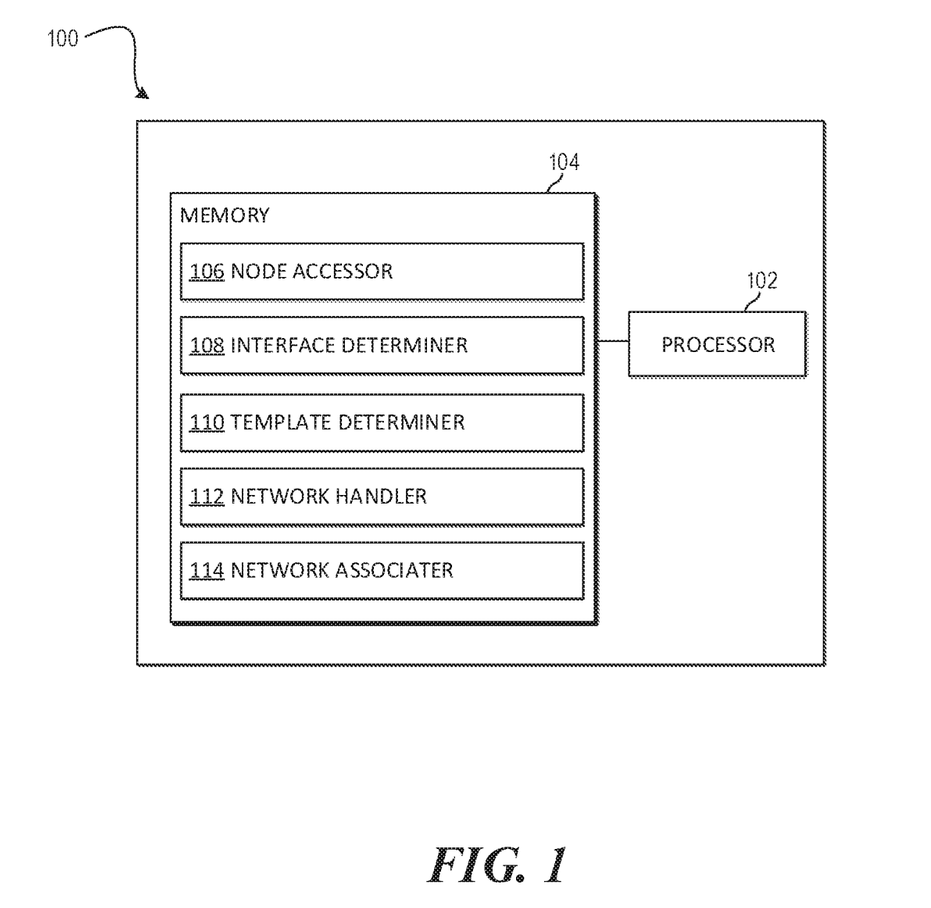
FIG. 1 is a block diagram of an example system for node identification using templates.

FIG. 1 is a block diagram of an example system 100 for node identification using templates. System 100 may include a processor 102 and a machine-readable medium 104 that may be coupled to each other through a communication link (e.g., a bus). Processor 102 may include a single or multiple Central Processing Units (CPU) or another suitable hardware processor(s). In some examples, machine-readable medium 104 stores machine readable instructions executed by processor 102 for system 100. Machine-readable medium 104 may include any suitable combination of volatile and/or non-volatile memory, such as combinations of Random Access Memory (RAM), Read-Only Memory (ROM), flash memory, and/or other suitable memory.

Machine-readable medium 104 stores instructions to be executed by processor 102 including instructions for node accessor 106, interface determiner 108, template determiner 110, network handler 112, network associater 114, and/or other components. According to various implementations, system 100 may be implemented in hardware and/or a combination of hardware and programming that configures hardware. Furthermore, in FIG. 1 and other Figures described herein, different numbers of components or entities than depicted may be used.

Processor 102 may execute node accessor 106 to access a first node belonging to a plurality of nodes. The plurality of nodes may be part of a cluster environment. In some aspects, the first node may be a lead node associated with the plurality of nodes, such that the settings for the lead node are applicable to the associated plurality of nodes. The first node may be a management node and the plurality of nodes may be nodes managed by the management node Processor 102 may execute interface determiner 108 to determine a hardware interface associated with the first node. The hardware interface may be an interface used by the first node (and/or the plurality of nodes) to connect to the cluster environment. For example, the hardware interface may be a motherboard connection, PCI bus connection, Ethernet connection, etc. One or more of the nodes in the cluster environment may have a similar type hardware interface. Additionally, each node in the cluster environment may be connected to a different port on the type of hardware interface. In the above example, if the hardware interface is a motherboard, the different nodes may be connected to different ports of the motherboard.

Processor 102 may execute template determiner to determine a template corresponding to the hardware interface. The template may contain a predefined identifier associated with the hardware interface. The predefined identifier may be a predictable network name based on a hardware configuration of the first node. The predictable network name may be based on PCI bus information. One example template used for networking may include the following information: template=compute, network=my10gbe, network interface="ens8,ens9", bonding_master=bond10, bonding_mode=802.3ad." This example template includes a template name, a network name, a hardware interface (in this case the network interface) associated with the network as well as bonding information including bonding name and mode.

Because the names are known ahead of time, and thus are "predictable", templates may be created tying the hardware interfaces, via the predictable names, to different groupings of nodes. One example grouping is a network that the nodes may belong to. In the network example, the template may provide network configuration settings including Internet Protocol (IP) address. Another example grouping is for disk drives. In the disk drive example, the template may provide information on filesystems, partition tables, volume management, grouping of the disk drives (RAID, etc.), etc. These are example groupings and the techniques and templates discussed herein may be used with other types of grouping where the hardware interfaces are named using predictable naming techniques.

Accordingly, when new nodes are added and the hardware interface is identified, a template corresponding to the hardware interface may be determined. Using the information in that template, the node may be associated with a different grouping, such as a network. Once a grouping is associated with the node, various configuration settings associated with that grouping may be applied to the node. For example, if the grouping is a network, the node may be configured to operate on the network, the node may be assigned an Internet Protocol (IP) address, etc.

In other words, node Templates are a means to group like-nodes together including, for example, their network interfaces and tie them to specific settings and networks. Node templates may also allow a system to tie the physical network interfaces to networks. This includes allowing for bonding, where two or more interfaces may together form a connection to a given network for increased redundancy or speed.

Node templates may consist of two parts: (1) a node templates base and (2) a NIC template. The node templates base may define discover parameters including things like console device name, Baseboard management chip (BMC) authentication information, kernel names, image names, etc. Each node may also have one or more NIC templates. The NIC templates define information about how to tie networks to interfaces. There can be one template for each network. Information in a NIC Template include network interface(s) for the network, network name, bonding settings, etc.

In some aspects, the template may be implemented as a cluster definition file residing on the admin node. This file includes system data about nodes, interfaces, MAC addresses, and other cluster characteristics. In some aspects, the template may be implemented as a configuration file. Of course, these are example implementations and the templates may be implemented via other means.

In some aspects, the template determiner may construct a template for the hardware interface using a template syntax. In these aspects, the template determiner may identify configuration settings for the first node and combine the configuration settings with the template syntax to construct the template.

Processor 102 may execute network handler 112 to identify a network associated with the hardware interface. As described above, the hardware interface may be identified in the network template using the predefined identifier.

Processor 102 may execute network associater 114 to associate each node in the plurality of nodes, including the first node, with a network specified in the template.

In some aspects, processor 102 may execute a node replacer (not pictured) to perform the replacement process. The node replacer may identify the new node and determine whether the new node has a similar type of hardware interface to the replaced node. If the node replacer determines that the hardware interface is of a similar type, the node replacer may replace the first node with an updated first node, identify the updated first node and associate the new node with the network.

Processor 102 may also execute identifier assigner 114 to assign a plurality of identifiers to the plurality of nodes, wherein each node in the plurality of nodes is assigned a unique identifier belonging to the plurality of identifiers. In some aspects, processor 102 may execute a node discoverer to discover each node in the plurality of nodes using the template. Processor 102 may also execute identifier assigner 114 to assign names to the discovered nodes based on the template.

In some aspects, one or more of the nodes in the cluster environment may have multiple hardware interfaces. In one aspect, processor 102 may execute interface determiner 108 to determine a plurality of different hardware interfaces associated with the plurality of nodes. Each node in the plurality of nodes may be associated with at least one of the different hardware interfaces. Processor 102 may execute template determiner 110 to determine a plurality of templates. Each template in the plurality of templates may correspond to at least one of the different hardware interface.

Processor 102 may execute interface determiner 108 to determine, for each node in the plurality of nodes, at least one different hardware interface associated with the node. The interface determiner may further determine a second hardware interface associated with the first node and associate the second hardware interface with the template. Processor 102 may execute template determiner to determine, for each node, a corresponding template from the plurality of templates based on the at least one different hardware interface. Processor 102 may execute network associater 114 to, for each node, apply network settings to the node based on the corresponding template and apply an identifier, such as an IP address, to the node based on the corresponding template.

In some aspects, there may be multiple networks used in the cluster environment. In these aspects processor 102 may execute instructions of network handler 112 to identify a second network associated with the second hardware interface, wherein the second network is specified in the template and associate the second network with the first node.

Figure 2:
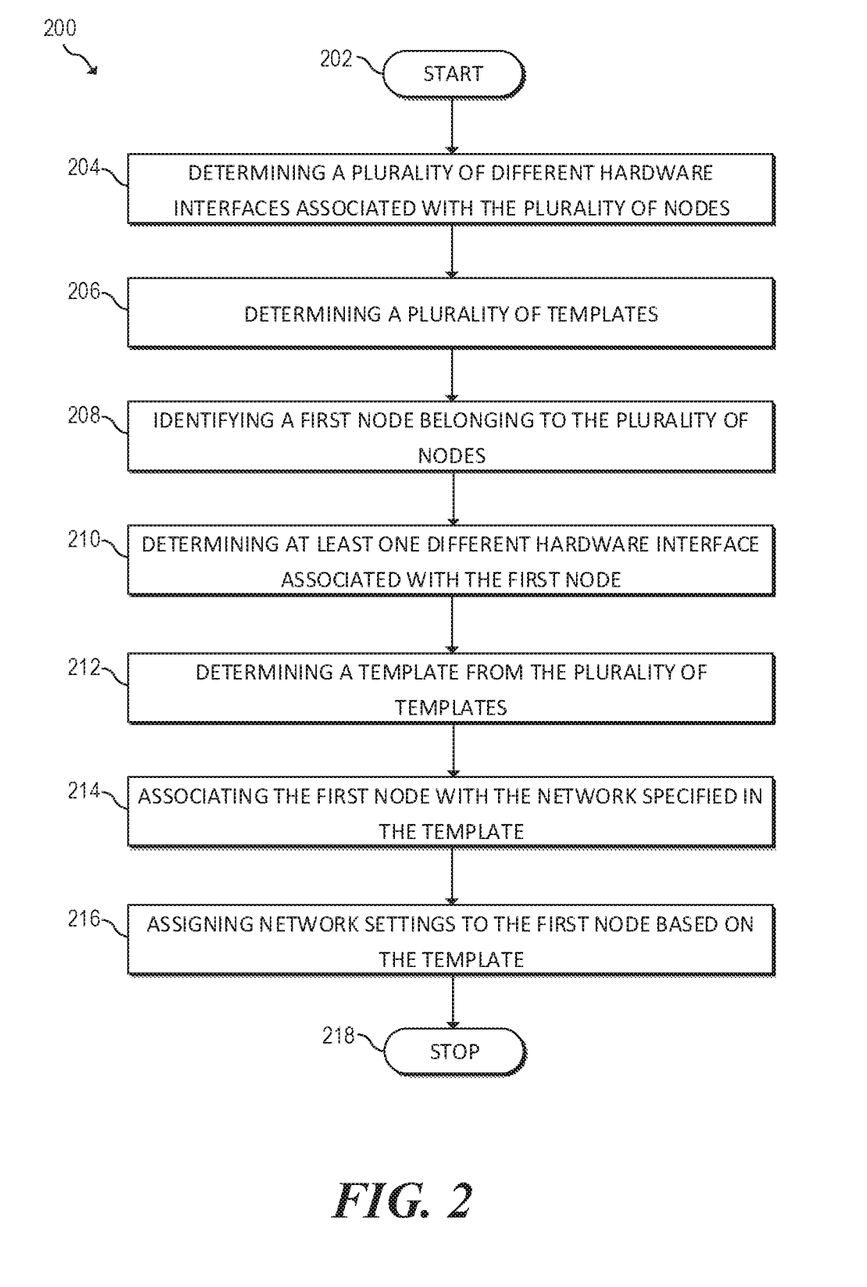
FIG. 2 is a flowchart of an example method for node identification using templates.

FIG. 2 is a flowchart of an example method 200 for node identification using templates. The flowchart represent processes that may be utilized in conjunction with various systems and devices as discussed with reference to the preceding figures, such as, for example, system 100 described in reference to FIG. 1 and/or system 500 described in reference to FIG. 5. While illustrated in a particular order, the flowchart is not intended to be so limited. Rather, it is expressly contemplated that various processes may occur in different orders and/or simultaneously with other processes than those illustrated. As such, the sequence of operations described in connection with FIG. 2 are examples and are not intended to be limiting. Additional or fewer operations or combinations of operations may be used or may vary without departing from the scope of the disclosed examples. Thus, the present disclosure merely sets forth possible examples of implementations, and many variations and modifications may be made to the described examples. Although, certain blocks are described as being performed by certain actors (boot environment, admin node, etc.) this is for illustration purposes and in some aspects these blocks may alternatively or additionally be performed by other actors.

Method 200 may start at block 202 and continue to block 204, where the method may include determining a plurality of different hardware interfaces associated with the plurality of nodes. At block 206, the method may include determining a plurality of templates. At block 208, the method may include identifying a first node belonging to the plurality of nodes. The first node may be a management node and the plurality of nodes are nodes managed by the management node. At block 210, the method may include determining at least one different hardware interface associated with the first node. At block 212, the method may include determining a template from the plurality of templates based on the at least one different hardware interface. The template may contain a predefined identifier associated with the hardware interface. Determining the template may include construct the template for the hardware interface using a template syntax.

At block 214, the method may include associating the first node with the network specified in the template. At block 216, the method may include assigning network settings to the first node based on the template. The predefined identifier may be a predictable network name based on a hardware configuration. The predictable network name may be based on PCI bus information. The predefined identifier may not be based on a MAC address of the node. The method may proceed to block 218, where the method may end.

Figure 3:
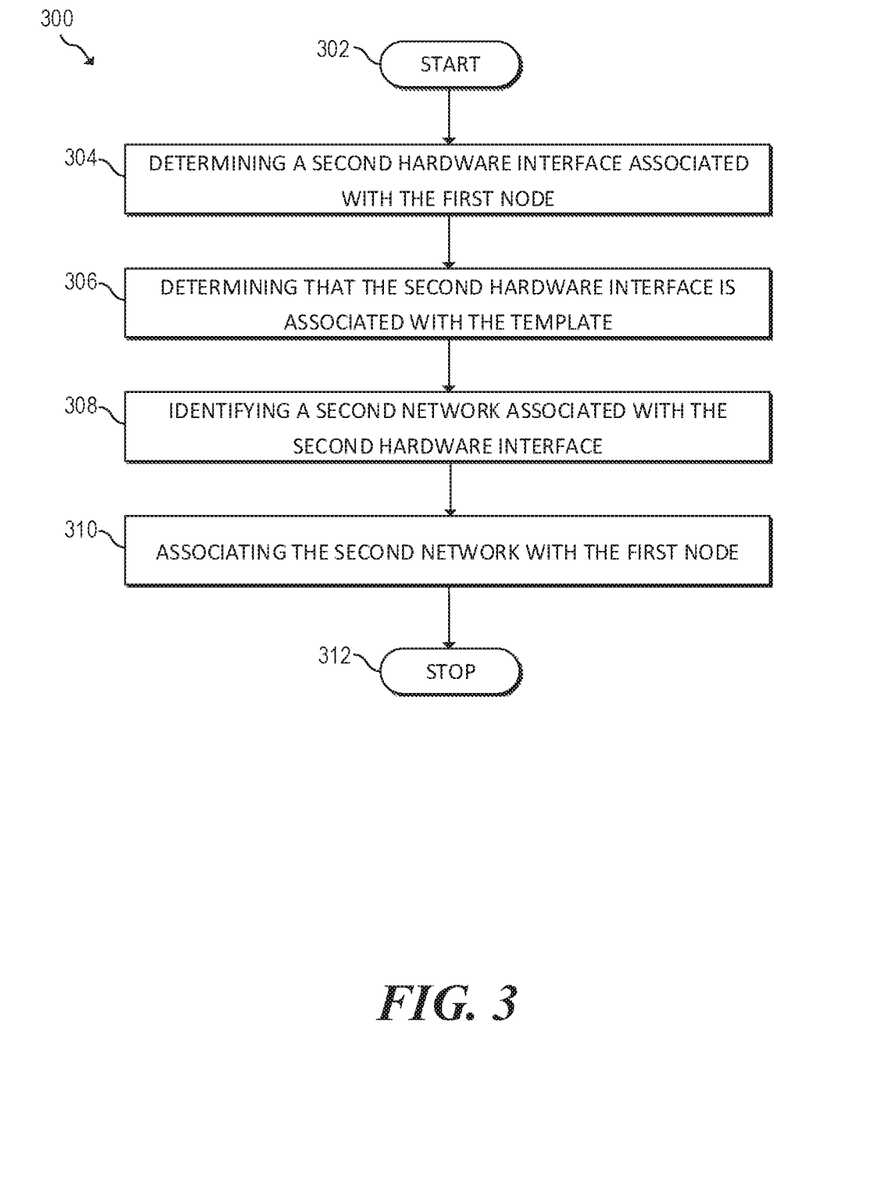
FIG. 3 is a flowchart of an example method for node identification for nodes with multiple hardware interfaces.

FIG. 3 is a flowchart of an example method 300 for node identification for nodes with multiple hardware interfaces. The flowchart represent processes that may be utilized in conjunction with various systems and devices as discussed with reference to the preceding figures, such as, for example, system 100 described in reference to FIG. 1 and/or system 500 described in reference to FIG. 5. While illustrated in a particular order, the flowchart is not intended to be so limited. Rather, it is expressly contemplated that various processes may occur in different orders and/or simultaneously with other processes than those illustrated. As such, the sequence of operations described in connection with FIG. 3 are examples and are not intended to be limiting. Additional or fewer operations or combinations of operations may be used or may vary without departing from the scope of the disclosed examples. Thus, the present disclosure merely sets forth possible examples of implementations, and many variations and modifications may be made to the described examples.

The method may start at block 302 and continue to block 304, where the method may include determining a second hardware interface associated with the first node. At block 306, the method may include determining that the second hardware interface is associated with the template. At block 308 the method may include identifying a second network associated with the second hardware interface and at block 310 the method may include associating the second network with the first node. The method may proceed to block 312, where the method may end.

Figure 4:
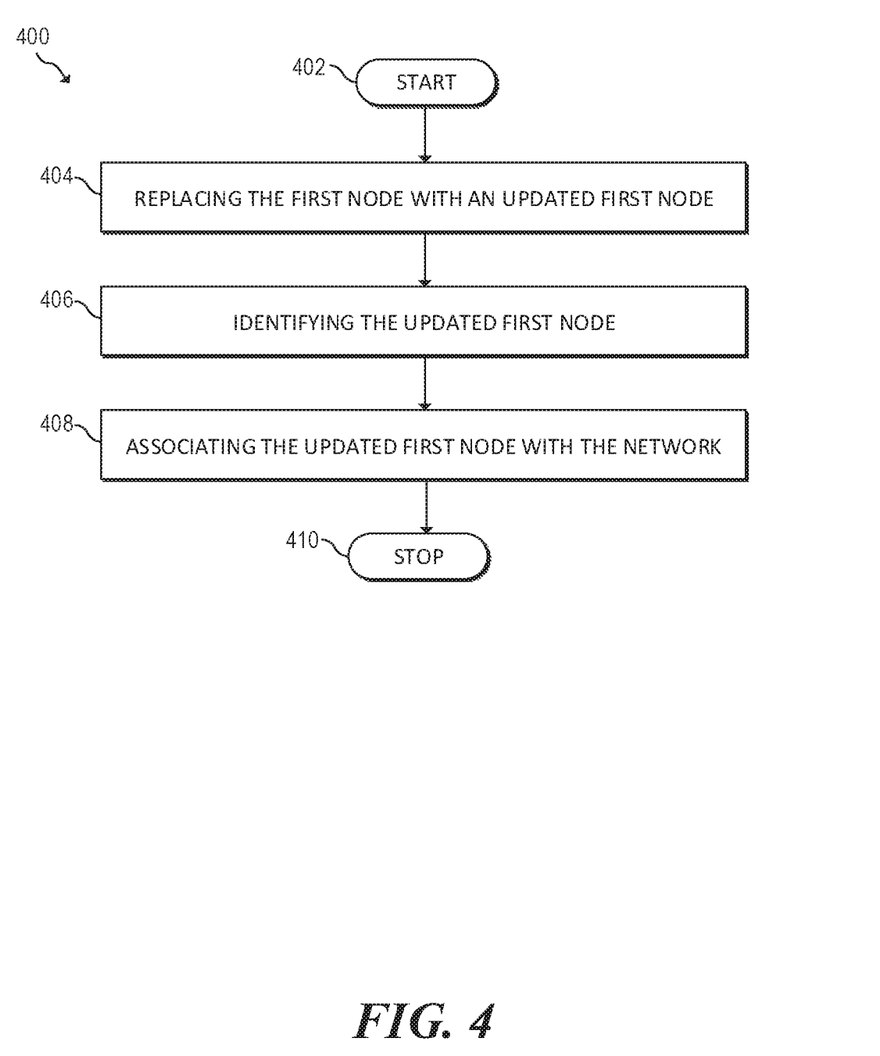
FIG. 4 is a flowchart of an example method for replacing nodes.
Figure 5:
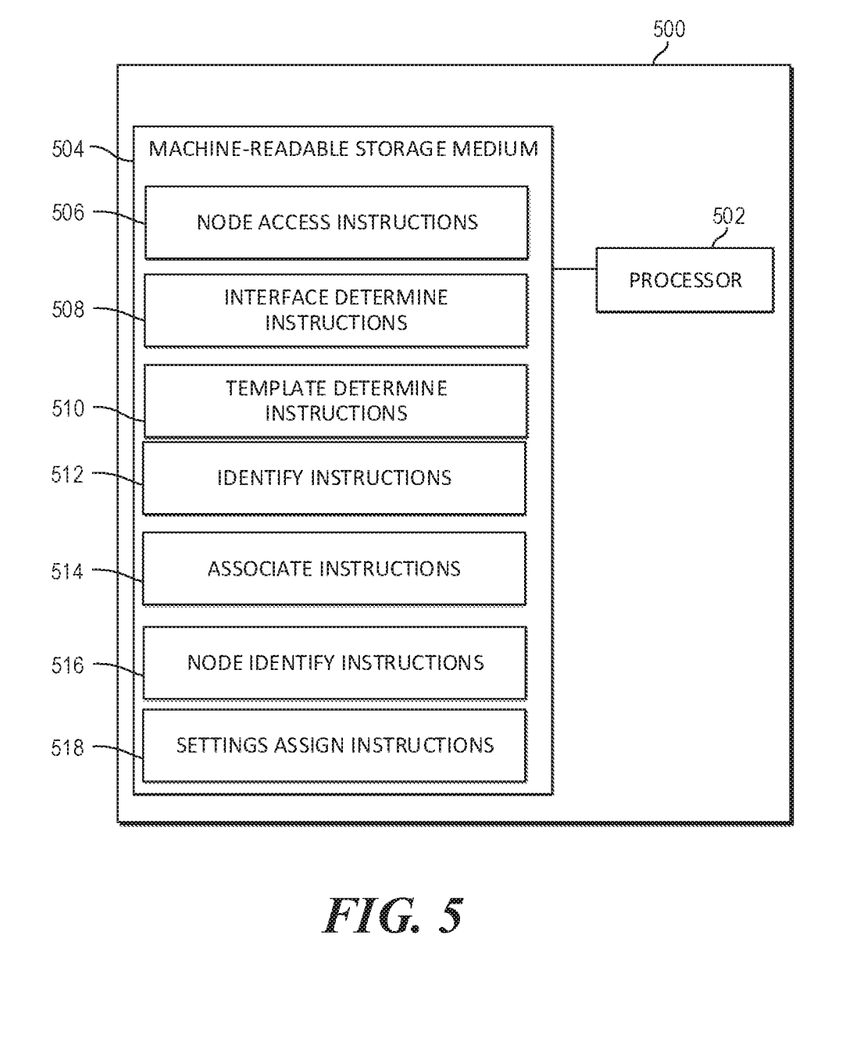
FIG. 5 is a block diagram of an example system for node identification using templates.

FIG. 4 is a flowchart of an example method 400 for replacing nodes. The flowchart represent processes that may be utilized in conjunction with various systems and devices as discussed with reference to the preceding figures, such as, for example, system 100 described in reference to FIG. 1 and/or system 500 described in reference to FIG. 5. While illustrated in a particular order, the flowchart is not intended to be so limited. Rather, it is expressly contemplated that various processes may occur in different orders and/or simultaneously with other processes than those illustrated. As such, the sequence of operations described in connection with FIG. 5 are examples and are not intended to be limiting. Additional or fewer operations or combinations of operations may be used or may vary without departing from the scope of the disclosed examples. Thus, the present disclosure merely sets forth possible examples of implementations, and many variations and modifications may be made to the described examples.

Method 400 may start at block 402 and continue to block 404, where the method may include replacing the first node with an updated first node. At block 406, the method may include identifying the updated first node. At block 408, the method may include associating the updated first node with the network. The method may proceed to block 410, where the method may end.

FIG. 5 is a block diagram of an example system 500 for node identification using templates. In the example illustrated in FIG. 5, system 500 includes a processing core 502. Although the following descriptions refer to a single processing core, the descriptions may also apply to a system with multiple processing cores. In such examples, the instructions may be distributed (e.g., executed by) across multiple processing cores.

Processor 502 may be at least one central processing unit (CPU), microprocessor, and/or other hardware devices suitable for retrieval and execution of instructions. In the example illustrated in FIG. 5, processor 502 may fetch, decode, and execute instructions 506, 508, 510, 512, 514, 516 and 518 to node identification using templates. In some examples, instructions 506, 508, 510, 512, 514, 516 and 518 may be stored on a machine-readable medium. The machine-readable medium may include any volatile memory, non-volatile memory, or any suitable combination of volatile and non-volatile memory. Machine-readable medium 504 may comprise, for example, may be, for example, Random Access Memory (RAM), an Electrically-Erasable Programmable Read-Only Memory (EEPROM), a storage drive, an optical disc, and/or other suitable memory. Machine-readable medium 504 may also include a random access non-volatile memory that can retain content when the power is off. Processor 502 may include at least one electronic circuit comprising a number of electronic components for performing the functionality of at least one of the instructions. With respect to the executable instruction representations (e.g., boxes) described and shown herein, it should be understood that part or all of the executable instructions and/or electronic circuits included within one box may be included in a different box shown in the figures or in a different box not shown.

Referring to FIG. 5, node access instructions 506, when executed by a processor (e.g., 502), may cause system 500 to access a first node. Interface determine instructions 508, when executed by a processor (e.g., 502), may cause system 500 to determine a hardware interface associated with the first node. Template determine instructions 510, when executed by a processor (e.g., 502), may cause system 500 to determine a template corresponding to the hardware interface. The template may contain a predefined identifier associated with the hardware interface. Determining the template may comprise constructing a template for the hardware interface using a template syntax. Identify instructions 512, when executed by a processor (e.g., 502), may cause system 500 to identify, based on the predefined identifier, a grouping associated with the hardware interface, wherein the grouping is specified in the template.

Associate instructions 514, when executed by a processor (e.g., 502), may cause system 500 to associate the first node with a network specified in the template. The predefined identifier may be a predictable network name based on a hardware configuration. The predictable network name may be based on PCI bus information. The predefined identifier may not be based on a MAC address of the node. Node identify instructions 516, when executed by a processor (e.g., 502), may cause system 500 to identify a plurality of nodes associated with the hardware interface. The plurality of nodes are associated with the hardware interface. Settings assign instructions 518, when executed by a processor (e.g., 502), may cause system 500 to assign network settings to each node in the plurality of nodes based on the template.

The foregoing disclosure describes a number of examples of node identification using templates. The disclosed examples may include systems, devices, computer-readable storage media, and methods for node identification using templates. For purposes of explanation, certain examples are described with reference to the components illustrated in FIGS. 1-5. The content type of the illustrated components may overlap, however, and may be present in a fewer or greater number of elements and components. Further, all or part of the content type of illustrated elements may co-exist or be distributed among several geographically dispersed locations. Further, the disclosed examples may be implemented in various environments and are not limited to the illustrated examples.

Further, the sequence of operations described in connection with FIGS. 1-5 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples.

What is claimed is:

1. A system comprising:
a node accessor to access a first node belonging to a plurality of nodes;
an interface determiner to determine a first hardware interface associated with the first node;
a template determiner to determine a template corresponding to the first hardware interface, wherein the template contains a predefined identifier associated with the first hardware interface, the template identifies a first network, and the predefined identifier comprises a first predictable name based on a hardware configuration of the first node, the first predictable name used to associate the first node to the first network;
a network handler to identify the first network associated with the predefined identifier; and
a network associater to associate each node in the plurality of nodes, including the first node, with the first network identified based on the template.

2. The system of claim 1, comprising:
the interface determiner to determine a plurality of different hardware interfaces associated with the plurality of nodes, wherein each node in the plurality of nodes is associated with at least one of the plurality of different hardware interfaces including the first hardware interface; and
the template determiner to determine a plurality of templates, each template in the plurality of templates corresponding to at least one of the plurality of different hardware interfaces.

3. The system of claim 1, comprising:
the interface determiner to determine, for each node in the plurality of nodes, at least one different hardware interface associated with the node;
the template determiner to determine, for each node, a corresponding template from the plurality of templates based on the at least one different hardware interface;
the network associater to, apply, for each node, network settings to the node based on the corresponding template.

4. The system of claim 1, wherein
interface determiner to:
determine a second hardware interface associated with the first node.

5. The system of claim 4, further comprising:
the network handler to:
identify a second network associated with the second hardware interface, wherein the second network is identified based on a second predictable name in the template; and
associate the second network with the first node.

6. The system of claim 1, further comprising:
a node replacer to:
replace the first node with an updated first node;
identify the updated first node; and
associate the updated first node with the first network.

7. The system of claim 1, further comprising:
the template determiner to:
construct the template for the hardware interface using a template syntax.

8. The system of claim 1, comprising:
a node discoverer to discover each node in the plurality of nodes using the template.

9. The system of claim 1, wherein the first node is a management node and the plurality of nodes are nodes managed by the management node.

10. The system of claim 1, wherein the predefined identifier is a predictable network name based on a hardware configuration.

11. The system of claim 10, wherein the predictable network name is based on PCI bus information.

12. The system of claim 1, wherein the predefined identifier is based on information about the first hardware interface independent of a MAC address.

13. A method comprising:
determining a plurality of different hardware interfaces associated with a plurality of nodes, wherein each node in the plurality of nodes is associated with at least one of the plurality of different hardware interfaces;
determining a plurality of templates, each template in the plurality of templates corresponding to at least one of the plurality of different hardware interfaces;
identifying a first node belonging to the plurality of nodes based, in part, on a unique predictable name of each of the plurality of different hardware interfaces;
determining at least one different hardware interface, selected from the plurality of different hardware interfaces, associated with the first node;
determining a first template from the plurality of templates based on the at least one different hardware interface, wherein the first template contains a predefined identifier associated with the at least one different hardware interface and wherein the first template identifies a first network and the unique predictable name of the at least one different hardware interface is used as part of the determination;
associating the first node with the first network identified based on the first template; and
assigning network settings to the first node based on the first template.

14. The method of claim 13, further comprising:
identifying a second network associated with a second hardware interface of the first node; and
associating the second network with the first node.

15. The method of claim 13, comprising
replacing the first node with an updated first node;
identifying the updated first node; and
associating the first node with the first network.

16. A non-transitory machine-readable storage medium encoded with instructions, the instructions executable by a processor of a system to cause the system to:
access a first node;
determine a hardware interface associated with the first node;
determine a template corresponding to the hardware interface, wherein the template contains a predefined identifier associated with the hardware interface, the template identifies a network, and the predefined identifier comprises a predictable name based on a hardware configuration of the first node, the first predictable name used to associate the first node to the network;
identify, based on the predefined identifier, a grouping associated with the hardware interface, wherein the grouping is identified based on the template;
associate the first node with the network identified based on the template;
identify a plurality of nodes associated with the first node, wherein the plurality of nodes are further associated with the hardware interface; and
assign network settings to each node in the plurality of nodes based on the template.

17. The non-transitory machine-readable storage medium of claim 16, wherein the instructions to determine the template corresponding to the hardware interface, cause the system to:
construct the template for the hardware interface using a template syntax.

18. The non-transitory machine-readable storage medium of claim 16, wherein the predefined identifier is a predictable network name based on a hardware configuration.

19. The non-transitory machine-readable storage medium of claim 18, wherein the predictable network name is based on PCI bus information.

20. The non-transitory machine-readable storage medium of claim 16, wherein the predefined identifier is based on information about the hardware interface independent of a MAC address.

* * * * *